United States Patent
Zhang et al.

(10) Patent No.: US 10,318,343 B2
(45) Date of Patent: Jun. 11, 2019

(54) MIGRATION METHODS AND APPARATUSES FOR MIGRATING VIRTUAL MACHINE INCLUDING LOCALLY STORED AND SHARED DATA

(71) Applicant: Beijing Baidu Netcom Science and Technology Co., Ltd., Beijing (CN)

(72) Inventors: Yu Zhang, Beijing (CN); Zhen Xu, Beijing (CN); Feifei Cao, Beijing (CN); Guangjun Xie, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/534,589

(22) PCT Filed: Nov. 27, 2015

(86) PCT No.: PCT/CN2015/095753
§ 371 (c)(1),
(2) Date: Jun. 9, 2017

(87) PCT Pub. No.: WO2017/045272
PCT Pub. Date: Mar. 23, 2017

(65) Prior Publication Data
US 2018/0203726 A1    Jul. 19, 2018

(30) Foreign Application Priority Data
Sep. 16, 2015  (CN) .......................... 2015 1 0590738

(51) Int. Cl.
*G06F 9/48*    (2006.01)
*G06F 3/06*    (2006.01)
*G06F 9/455*   (2018.01)

(52) U.S. Cl.
CPC .......... *G06F 9/4856* (2013.01); *G06F 3/0647* (2013.01); *G06F 9/45558* (2013.01); *G06F 2009/4557* (2013.01)

(58) Field of Classification Search
CPC .................................................. G06F 9/45558
See application file for complete search history.

(56) References Cited

U.S. PATENT DOCUMENTS

2011/0270945 A1*  11/2011  Shiga ................... G06F 3/0605
                                                                    709/213
2013/0235519 A1*  9/2013  Miyauchi ........... H05K 7/20745
                                                                    361/679.46
(Continued)

FOREIGN PATENT DOCUMENTS

CN       102821158 A       12/2012
CN       104660690 A        5/2015
CN       104699522 A        6/2015

OTHER PUBLICATIONS

International Search Report corresponding to International Patent Application No. PCT/CN2015/095753, State Intellectual Property Office of the P.R. China, dated Jun. 14, 2016; (2 pages).
(Continued)

Primary Examiner — Charlie Sun
(74) Attorney, Agent, or Firm — Nixon Peabody LLP

(57) ABSTRACT

The present application discloses a virtual machine migration method and apparatus. A specific implementation of the method includes: receiving a migration request for migrating a virtual machine, wherein to-be-migrated data of the virtual machine comprises local data locally stored and shared data accessible by the virtual machine at a plurality of locations; determining migration operations respectively corresponding to the local data and the shared data in response to the migration request; and executing the migration operations corresponding to the local data and the shared data, to
(Continued)

complete migration of the virtual machine. This implementation achieves the migration of a virtual machine with a hybrid storage mode, that is, a storage mode in which the data to be migrated includes both local data and shared data.

13 Claims, 4 Drawing Sheets

(56) References Cited

U.S. PATENT DOCUMENTS

2014/0040888 A1    2/2014  Bookman et al.
2014/0229944 A1*   8/2014  Wang .................... G06F 9/5088
                                                              718/1

OTHER PUBLICATIONS

He Mei-jun et al.; A virtual machine live-migration improvement solution based on hybrid-migration mechanism in OpenStack; Dated Jun. 2014 (5 Pages).

* cited by examiner

MIGRATION METHODS AND APPARATUSES FOR MIGRATING VIRTUAL MACHINE INCLUDING LOCALLY STORED AND SHARED DATA

CROSS-REFERENCE TO RELATED APPLICATION

This application is a U.S. National Stage of International Application No. PCT/CN2015/095753, filed Nov. 27, 2015, which is related to and claims priority from Chinese Application No. 201510590738.2, filed on Sep. 16, 2015, the entire disclosures of which are hereby incorporated by reference in their entireties.

TECHNICAL FIELD

The present application relates to the field of computer technology, specifically to the field of virtual machine, and more specifically to a virtual machine migration method and apparatus.

BACKGROUND

In cloud computing applications, migration of virtual machines on a cloud computing platform is a commonly used function. Generally, data in a virtual machine is stored in a completely local storage mode, that is, all the data is stored locally; or data in a virtual machine is stored in a completely shared storage mode, that is, all the data is stored in a shared storage device that can be accessed from multiple locations. When the completely local storage mode is used, the virtual machine is migrated by copying local data to a target terminal. When the completely shared storage mode is used, the virtual machine is migrated by mounting the shared storage device to a target terminal.

However, the above-mentioned virtual machine migration method only supports the migration of a virtual machine with a single storage mode, and cannot be used to migrate a virtual machine of which data includes both local data and shared storage data.

SUMMARY

The present application provides a method and apparatus for migrating a virtual machine, to solve the technical problem mentioned above.

According to a first aspect, the present application provides a method for migrating a virtual machine. The method comprises: receiving a migration request for migrating a virtual machine, wherein to-be-migrated data of the virtual machine comprises local data locally stored and shared data accessible by the virtual machine at a plurality of locations; determining migration operations respectively corresponding to the local data and the shared data in response to the migration request; and executing the migration operations corresponding to the local data and the shared data, to complete migration of the virtual machine.

According to a second aspect, the present application provides an apparatus for migrating a virtual machine. The apparatus comprises: a receiving unit, configured to receive a migration request for migrating a virtual machine, wherein to-be-migrated data of the virtual machine comprises local data locally stored and shared data accessible by the virtual machine at a plurality of locations; a responding unit, configured to determine migration operations respectively corresponding to the local data and the shared data in response to the migration request; and an execution unit, configured to execute the migration operations corresponding to the local data and the shared data, to complete migration of the virtual machine.

The method and apparatus for migrating a virtual machine provided in the present application comprises: receiving a migration request for migrating a virtual machine, wherein to-be-migrated data of the virtual machine comprises local data locally stored and shared data accessible by the virtual machine at a plurality of locations; determining migration operations respectively corresponding to the local data and the shared data in response to the migration request; and executing the migration operations corresponding to the local data and the shared data, to complete migration of the virtual machine. Thus, the migration of a virtual machine with a hybrid storage mode, that is, a storage mode in which the data to be migrated includes both local data and shared data, can be achieved.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
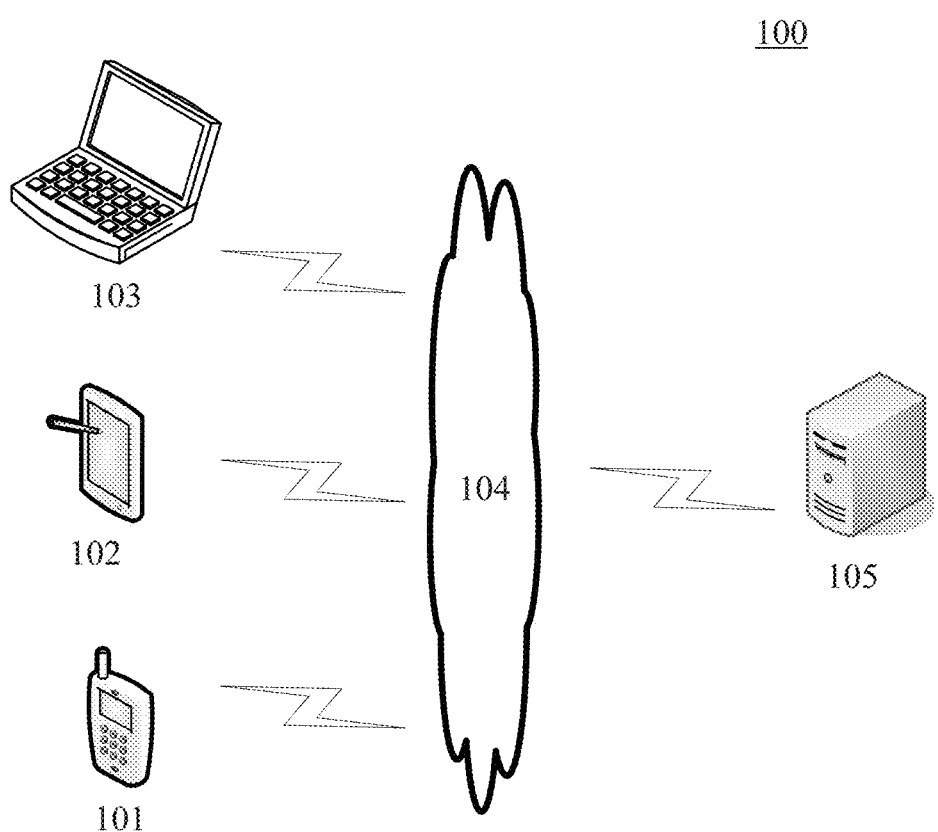
FIG. 1 is an exemplary architecture diagram of a system to which the present application may be applied.

FIG. 1 shows an exemplary architecture of a system 100 to which the method or apparatus for migrating a virtual machine according to embodiments of the present application may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless communication links, or optical fibers.

The user may use the terminal devices 101, 102 and 103 to interact with the server 105 through the network 104, in order to transmit or receive messages, etc. An application, such as a virtual machine, may run on the terminal devices 101, 102 and 103.

The terminal devices 101, 102, and 103 may be various electronic devices having a display screen and supporting network communication, including but not limited to, a smart phone, a tablet computer, an e-book reader, a Moving Picture Experts Group Audio Layer III (MP3) player, a Moving Picture Experts Group Audio Layer IV (MP4) player, a laptop portable computer, a desktop computer, and the like.

The server 105 may be a server providing various services, for example, a server supporting the migration of a virtual machine running on the terminal devices 101, 102, and 103. The server may process a received request for migrating a virtual machine, and migrate the virtual machine running on the terminal device.

It should be appreciated that the numbers of the terminal devices, the network and the server in FIG. 1 are merely illustrative. Any number of terminal devices, networks and servers may be provided based on the actual requirements.

Figure 2:
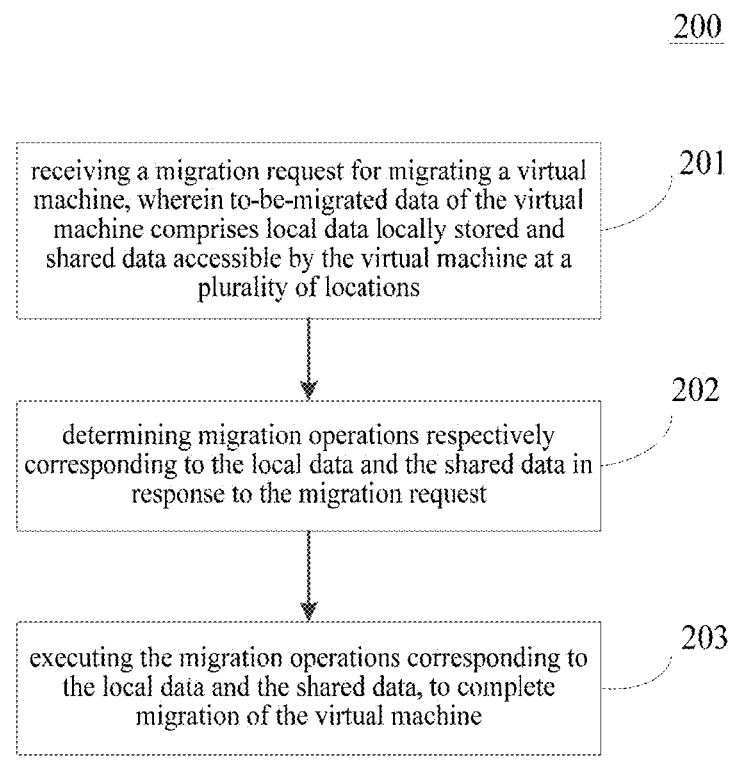
FIG. 2 is a flow chart of a virtual machine migration method according to an embodiment of the present application.

Referring to FIG. 2, a flow 200 of a virtual machine migration method according to an embodiment of the present application is illustrated. The virtual machine migration method provided in this embodiment may be executed by the terminal device 101, 102, or 103 or the server 105. The method includes the following steps.

Step 201 is to receive a migration request for migrating a virtual machine, wherein to-be-migrated data of the virtual machine comprises local data locally stored and shared data accessible by the virtual machine at a plurality of locations.

In this embodiment, the virtual machine may be a virtual machine of KVM, XEN, or Hyper-V type that runs on a physical machine and is generated by using a virtualization technology. A virtual memory or a virtual disk may be configured for the virtual machine. In this embodiment, the to-be-migrated data corresponding to the virtual machine may be stored locally, for example, stored in a virtual memory or virtual disk that is allocated to the virtual machine by the physical machine on which the virtual machine resides. Correspondingly, the data stored locally may be referred to as local data. Alternatively, the to-be-migrated data of the virtual machine may be stored on a shared storage device (for example, a cloud server), and the data stored on the cloud server may be referred to as shared data. The virtual machine may access the shared data stored on the cloud server from multiple locations through an access interface provided by the cloud server. In this embodiment, data on the virtual machine that is associated with an operating system running on the virtual machine (or referred to as system disk data) may be stored locally, and data accessed during running of the virtual machine (or referred to as data disk data) may be stored on the shared storage device. The above-mentioned storage mode may be referred to as a hybrid storage mode.

Step 202 is to determine migration operations respectively corresponding to the local data and the shared data in response to the migration request.

In this embodiment, after the migration request for migrating the virtual machine is received, migration operations respectively corresponding to the local data and the shared data in the to-be-migrated data may further be determined in response to the migration request.

In some optional implementations of this embodiment, the migration operations comprise: a copy operation for copying the to-be-migrated data to a target terminal, and a mounting operation for mounting a storage device file corresponding to the to-be-migrated data to the target terminal. It should be noted that in this embodiment, the term "storage device" may refer to a device file. For example, in a Linux operating system, each hardware device corresponds to one device file, and read and write operations on the device are implemented by reading from and writing to the device file. Therefore, in this embodiment, mounting a storage device to the target terminal may be mounting a device file corresponding to the device to the target terminal.

The process of determining the migration operations corresponding to the local data and the shared data is described below by using a hybrid storage mode in which the system disk data in the to-be-migrated data of the virtual machine is stored locally and the data disk data is stored on a cloud storage server as an example. The system disk data may be copied and then sent to the target terminal. Meanwhile, the data disk data of the virtual machine does not need to be copied, but instead, the shared storage device corresponding to the data disk data is mounted to the target terminal. Thus, the migration of the virtual machine in the hybrid storage mode is completed.

In some optional implementations of this embodiment, the determining migration operations respectively corresponding to the local data and the shared data in response to the migration request includes: determining a local storage device identifier of a local storage device corresponding to the local data and a shared storage device identifier of a shared storage device corresponding to the shared data and binding the shared storage device identifier to shared storage device feature information presenting a feature of the shared storage device, in response to the migration request; transmitting the local storage device identifier and the shared storage device identifier, as an input parameter of a driver layer under a local storage mode interface of a cloud computing management framework OpenStack, to the driver layer, to trigger a storage device distinguishing operation of the driver layer, wherein the storage device distinguishing operation comprises: determining whether a storage device identifier in the input parameter corresponds to the shared storage device feature information to obtain a determination result, and distinguishing the local storage device identifier from the shared storage device identifier in the input parameter based on the determination result; and determining the migration operations respectively corresponding to the local data and the shared data based on the local storage device identifier and the shared storage device identifier.

In this embodiment, the migration operations for the virtual machine may be performed by using a cloud computing management framework OpenStack framework. The OpenStack is an open-source framework that can provide virtual computing support for public/private cloud computing platforms. Modules in the OpenStack framework that are related to the operations on the virtual machine are briefly described below. The OpenStack framework includes a Nova module (or referred to as a Nova layer), a Libvirt module (or referred to as a Libvirt layer), a driver module (or referred to as a driver layer). The Nova layer is used for supporting virtualization of CPUs, memory, network adapters, and hardware drives. The Libvirt layer is used for the centralized management of all virtual machines that are generated by using various different virtualization technologies. The driver layer is used for implementing underlying operations for the virtual machine. In the OpenStack framework, the Nova layer, the Libvirt layer, and the driver layer can respectively provide corresponding support for the operations related to each virtual machine. Taking virtual machine migration as an example, the Nova layer, the Libvirt layer, and the driver layer all include virtual machine migration-related operations.

In some optional implementations of this embodiment, the driver layer is Qemu-Kvm.

Figure 3:
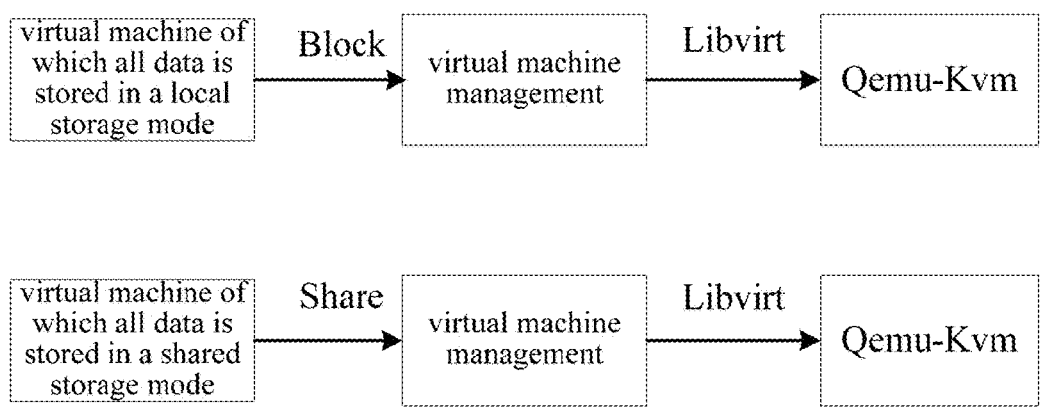
FIG. 3 is a diagram illustrating the principle of virtual machine migration according to a known technology.

Referring to FIG. 3, a diagram illustrating the principle of virtual machine migration according to a known technology is illustrated. When a virtual machine is migrated by using the cloud computing management framework OpenStack, to-be-migrated data of the virtual machine is migrated to a target terminal (for example, a target physical machine) by executing the virtual machine migration-related operations that are provided by the Libvirt layer and the Qemu-Kvm layer in the OpenStack framework, thus completing the migration of the virtual machine. In FIG. 3, the Block storage mode is the local storage mode, that is, all of the to-be-migrated data of the virtual machine is stored locally; the Share storage mode is the shared storage mode, that is, all of the to-be-migrated data of the virtual machine is stored on a shared storage device. The OpenStack framework only supports the migration of virtual machines in the case of a single storage mode, that is, the local storage mode or the shared storage mode. A virtual machine migration process using the OpenStack is as follows. In the Nova layer, an interface corresponding to the local storage mode (or referred to as a Block interface) and an interface corresponding to the shared storage mode are defined. When a virtual machine is migrated, the virtual machine migration-related operations corresponding to the storage modes that are defined in the Libvirt layer and the Qemu-Kvm layer are triggered at different interfaces according to different migration instructions received. For example, when the migration instruction is a local migration instruction for migrating the local data, the virtual machine migration-related operation corresponding to the local storage mode that is defined in the Libvirt layer and the Qemu-Kvm layer, that is, the operation of copying the to-be-migrated data and then sending the to-be-migrated data to the target terminal, is triggered at the Block interface. When the migration instruction is a shared migration instruction for migrating the shared data, the virtual machine migration-related operation corresponding to the shared storage mode that is defined in the Libvirt layer and the Qemu-Kvm layer, that is, the operation of mounting the shared storage device file to the target terminal, is triggered at the shared storage interface.

The process of determining the migration operations corresponding to the local data and the shared data by using the OpenStack framework in this embodiment is described below. In this embodiment, in response to the migration request, a local storage device identifier of a local storage device corresponding to the local data and a shared storage device identifier of a shared storage device corresponding to the shared data may be determined first, and the shared storage device identifier may be bound to shared storage device feature information that indicates a feature of the shared storage device. Taking the hybrid storage mode in which the system disk data in the to-be-migrated data of the virtual machine is stored locally and the data disk data is stored on a cloud server as an example, an identifier of the local storage device (for example, a virtual disk) where the system disk data is stored and an identifier of the shared storage device (the cloud server) where the data disk data is stored may be determined first, and the identifier of the shared storage device may be bound to shared storage device feature information that indicates a feature of the shared storage device, where the shared storage device feature information may be acquired in advance.

In this embodiment, after the local storage device identifier and the shared storage device identifier are determined, a storage device identifier set may be generated. The storage device identifier set is used as an input parameter of the driver layer. In this embodiment, the input parameter of the driver layer is added into a local migration instruction used for migrating the local data, and then the local migration instruction is sent to the Nova layer. The Nova layer may reuse a local storage mode interface according to the local migration instruction, that is, trigger, at the interface corresponding to the local storage mode at the Nova layer, the virtual machine migration-related operation corresponding to the local storage mode that is defined in the Libvirt layer and the Qemu-Kvm layer. The Libvirt layer includes a virtual machine migration-related interface. The input parameter of the driver layer may be parsed out from the local migration instruction. Then the input parameter of the driver layer is added into a local migration parameter that indicates the local storage mode and passed to the interface. Finally, the local migration parameter carrying the input parameter of the driver layer is passed to the Qemu-Kvm layer through the interface, to trigger the virtual machine migration-related operation corresponding to the local storage mode that is defined in the Qemu-Kvm layer.

In this embodiment, in the Qemu-Kvm layer, when receiving a local migration parameter, the Qemu-Kvm layer executes by default an operation of copying data on all storage devices. Therefore, the local storage device and the shared storage device may be distinguished in the Qemu-Kvm layer. That is, in this embodiment, the virtual machine migration-related operation corresponding to the local storage mode that is defined in the Qemu-Kvm layer includes an operation of distinguishing the local storage device from the shared storage device. The operation of distinguishing the local storage device from the shared storage device in the Qemu-Kvm layer may be as follows. The Qemu-Kvm layer may determine, based on the input parameter in the received local migration parameter, that is, a device identifier set including the local storage device identifier and the shared storage device identifier, whether a storage device identifier in the device identifier set corresponds to the shared storage device feature information to obtain a determination result. When a storage device identifier in the device identifier set corresponds to the shared storage device feature information, the determination result is that the storage device corresponding to the storage device identifier is the shared storage device. After all the storage device identifiers in the device identifier set are distinguished, the local storage device and the shared storage device may be determined in the Qemu-Kvm layer, and correspondingly, the migration operations respectively corresponding to the local data and the shared data may be determined in the Qemu-Kvm layer.

In some optional implementations of this embodiment, the determining the migration operations respectively corresponding to the local data and the shared data based on the local storage device identifier and the shared storage device identifier includes: determining the migration operation corresponding to the local data on the local storage device corresponding to the local storage device identifier as the copying operation, and determining the migration operation corresponding to the shared data on the shared storage device corresponding to the shared storage device identifier as the mounting operation.

In this embodiment, it may be determined that the migration operation corresponding to the local data on the local storage device corresponding to the local storage device identifier as determined through distinguishing is the copying operation. Meanwhile, it may be determined that the migration operation corresponding to the shared data on the shared storage device corresponding to the shared storage device identifier as determined through distinguishing is the mounting operation, that is, the shared data is not copied, but instead, the device file corresponding to the shared data is mounted to the target terminal. In this way, it is not necessary to perform a copying operation on the shared data that can be accessed from multiple locations during the virtual machine migration process, thereby reducing the consumption during migration, and accelerating the migration.

In some optional implementations of this embodiment, before the determining migration operations respectively corresponding to the local data and the shared data in response to the migration request, the method further includes: generating a storage device file corresponding to the shared data at the target terminal.

In this embodiment, before the migration operations respectively corresponding to the local data and the shared data are determined in response to the migration request, a storage device file corresponding to the shared data may be generated at the target terminal, so that during the migration process, the storage device file corresponding to the shared data can be mounted to the target terminal.

Step 203 is to execute the migration operations corresponding to the local data and the shared data, to complete migration of the virtual machine.

In this embodiment, after the migration operations corresponding to the local data and the shared data are determined, the migration operations corresponding to the local data and the shared data may be executed at the Qemu-Kvm layer, thus completing the migration of the virtual machine. For example, in the Qemu-Kvm layer, the local data may be copied to the target terminal; then in the Qemu-Kvm layer, the shared storage device file corresponding to the shared data is mounted to the target terminal. In this embodiment, because the read/write backend of the shared storage device already can ensure consistency, the target terminal does not need to reopen the shared storage device file after the file is mounted thereto.

In some optional implementations of this embodiment, after the executing the migration operations corresponding to the local data and the shared data, the method further includes: performing an un-mounting operation on the storage device file and removing the local data.

In this embodiment, the dynamic migration of virtual machines in the hybrid storage mode is implemented by extending the existing local storage Block mode in the OpenStack framework, that is, reusing a local storage mode interface. In addition, because the local storage device and the shared storage device are distinguished from each other, the copying operation is executed for the local storage device, and filtering is executed for the shared storage device, that is, the shared data is not copied, but instead, the shared storage device is mounted to the target terminal, thereby further reducing overheads during the virtual machine migration process.

Figure 4:
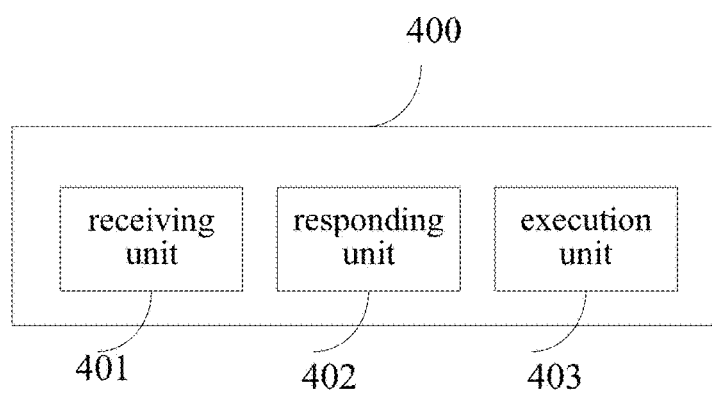
FIG. 4 is a schematic structural diagram of a virtual machine migration apparatus according to an embodiment of the present application.

Referring to FIG. 4, a schematic structural diagram of a virtual machine migration apparatus according to an embodiment of the present application is illustrated. The apparatus 400 includes: a receiving unit 401, a responding unit 402, and an execution unit 403. The receiving unit 401 is configured to receive a migration request for migrating a virtual machine, wherein to-be-migrated data of the virtual machine comprises local data locally stored and shared data accessible by the virtual machine at a plurality of locations. The responding unit 402 is configured to determine migration operations respectively corresponding to the local data and the shared data in response to the migration request. The execution unit 403 is configured to execute the migration operations corresponding to the local data and the shared data, to complete migration of the virtual machines.

In some optional implementations of this embodiment, the migration operations include: a copy operation for copying the to-be-migrated data to a target terminal, and a mounting operation for mounting a storage device file corresponding to the to-be-migrated data to the target terminal.

In some optional implementations of this embodiment, the responding unit includes: a migration request responding subunit, configured to: determine a local storage device identifier of a local storage device corresponding to the local data and a shared storage device identifier of a shared storage device corresponding to the shared data and bind the shared storage device identifier to shared storage device feature information presenting a feature of the shared storage device, in response to the migration request; a distinguishing subunit, configured to: transmit the local storage device identifier and the shared storage device identifier, as an input parameter of a driver layer under a local storage mode interface of a cloud computing management framework OpenStack, to the driver layer, to trigger a storage device distinguishing operation of the driver layer, wherein the storage device distinguishing operation comprises: determining whether a storage device identifier in the input parameter corresponds to the shared storage device feature information to obtain a determination result, and distinguishing the local storage device identifier from the shared storage device identifier in the input parameter based on the determination result; and a determining subunit, configured to determine the migration operations respectively corresponding to the local data and the shared data based on the local storage device identifier and the shared storage device identifier.

In some optional implementations of this embodiment, the determining subunit is further configured to: determine the migration operation corresponding to the local data on the local storage device corresponding to the local storage device identifier as the copying operation, and determine the migration operation corresponding to the shared data on the shared storage device corresponding to the shared storage device identifier as the mounting operation.

In some optional implementations of this embodiment, the driver layer is Qemu-Kvm.

In some optional implementations of this embodiment, the apparatus 400 further includes: a creation unit (not shown), configured to generate a storage device file corresponding to the shared data at the target terminal, before the determining migration operations respectively corresponding to the local data and the shared data in response to the migration request.

In some optional implementations of this embodiment, the apparatus 400 further includes: a removing unit (not shown), configured to perform an un-mounting operation on the storage device file and removing the local data, after the executing the migration operations corresponding to the local data and the shared data.

Figure 5:
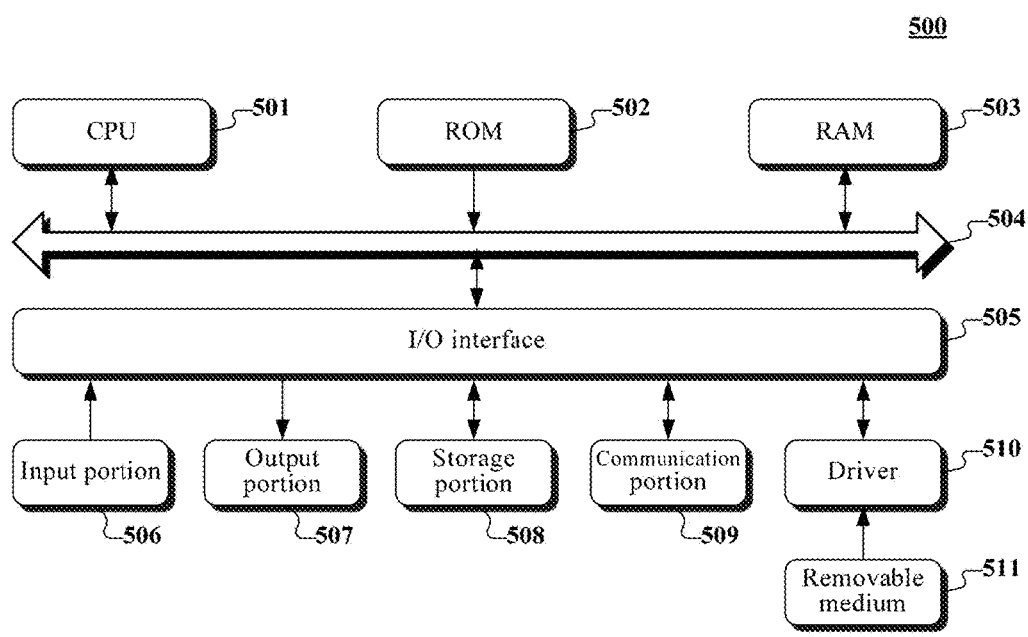
FIG. 5 illustrates a structural schematic diagram of a computer system adapted to implement a terminal device or server of the embodiments of the present application.

Referring to FIG. 5, a schematic structural diagram of a computer system 500 adapted to implement a server of the embodiments of the present disclosure is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, the present disclosure further provides a non-transitory computer storage medium. The non-transitory computer storage medium may be the non-transitory computer storage medium included in the apparatus in the above embodiments, or a stand-alone non-transitory computer storage medium which has not been assembled into the apparatus. The non-transitory computer storage medium stores one or more programs. The one or more programs, when executed by a device, cause the device to: receive a migration request for migrating a virtual machine, wherein to-be-migrated data of the virtual machine comprises local data locally stored and shared data accessible by the virtual machine at a plurality of locations; determine migration operations respectively corresponding to the local data and the shared data in response to the migration request; and execute the migration operations corresponding to the local data and the shared data, to complete migration of the virtual machine.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for migrating a virtual machine, comprising:
   receiving a migration request for migrating a virtual machine, wherein to-be-migrated data of the virtual machine comprises local data locally stored and shared data accessible by the virtual machine at a plurality of locations;
   determining migration operations respectively corresponding to the local data and the shared data in response to the migration request; and
   executing the migration operations corresponding to the local data and the shared data, to complete migration of the virtual machine;
   wherein the determining migration operations respectively corresponding to the local data and the shared data in response to the migration request comprises:
      determining a local storage device identifier of a local storage device corresponding to the local data and a shared storage device identifier of a shared storage device corresponding to the shared data and binding the shared storage device identifier to shared storage device feature information presenting a feature of the shared storage device, in response to the migration request;
      transmitting the local storage device identifier and the shared storage device identifier, as an input parameter of a driver layer under a local storage mode interface of a cloud computing management framework OpenStack, to the driver layer, to trigger a storage device distinguishing operation of the driver layer, wherein the storage device distinguishing operation comprises: determining whether a storage device identifier in the input parameter corresponds to the shared storage device feature information to obtain a determination result, and distinguishing the local storage device identifier from the shared storage device identifier in the input parameter based on the determination result; and
      determining the migration operations respectively corresponding to the local data and the shared data based on the local storage device identifier and the shared storage device identifier.

2. The method according to claim 1, wherein the migration operations comprise: a copy operation for copying the to-be-migrated data to a target terminal, and a mounting operation for mounting a storage device file corresponding to the to-be-migrated data to the target terminal.

3. The method according to claim 2, wherein the determining the migration operations respectively corresponding to the local data and the shared data based on the local storage device identifier and the shared storage device identifier comprises:
  determining the migration operation corresponding to the local data on the local storage device corresponding to the local storage device identifier as the copying operation, and determining the migration operation corresponding to the shared data on the shared storage device corresponding to the shared storage device identifier as the mounting operation.

4. The method according to claim 3, wherein the driver layer is Qemu-Kvm.

5. The method according to claim 1, further comprising:
  generating a storage device file corresponding to the shared data at the target terminal, before the determining migration operations respectively corresponding to the local data and the shared data in response to the migration request.

6. The method according to claim 5, further comprising:
  performing an un-mounting operation on the storage device file and removing the local data, after the executing the migration operations corresponding to the local data and the shared data.

7. A device, comprising:
  a processor; and
  a memory storing computer readable instructions executable by the processor, the computer readable instructions when executed by the processor, causing the processor to:
  receive a migration request for migrating a virtual machine, wherein to-be-migrated data of the virtual machine comprises local data locally stored and shared data accessible by the virtual machine at a plurality of locations;
  determine migration operations respectively corresponding to the local data and the shared data in response to the migration request; and
  execute the migration operations corresponding to the local data and the shared data, to complete migration of the virtual machine;
wherein the determining migration operations respectively corresponding to the local data and the shared data in response to the migration request comprises:
  determining a local storage device identifier of a local storage device corresponding to the local data and a shared storage device identifier of a shared storage device corresponding to the shared data and binding the shared storage device identifier to shared storage device feature information presenting a feature of the shared storage device, in response to the migration request;
  transmitting the local storage device identifier and the shared storage device identifier, as an input parameter of a driver layer under a local storage mode interface of a cloud computing management framework OpenStack, to the driver layer, to trigger a storage device distinguishing operation of the driver layer, wherein the storage device distinguishing operation comprises: determining whether a storage device identifier in the input parameter corresponds to the shared storage device feature information to obtain a determination result, and distinguishing the local storage device identifier from the shared storage device identifier in the input parameter based on the determination result; and
  determining the migration operations respectively corresponding to the local data and the shared data based on the local storage device identifier and the shared storage device identifier.

8. The device according to claim 7, wherein the migration operations comprise: a copy operation for copying the to-be-migrated data to a target terminal, and a mounting operation for mounting a storage device file corresponding to the to-be-migrated data to the target terminal.

9. The device according to claim 8, wherein the determining the migration operations respectively corresponding to the local data and the shared data based on the local storage device identifier and the shared storage device identifier comprises:
  determining the migration operation corresponding to the local data on the local storage device corresponding to the local storage device identifier as the copying operation, and determining the migration operation corresponding to the shared data on the shared storage device corresponding to the shared storage device identifier as the mounting operation.

10. The device according to claim 9, wherein the driver layer is Qemu-Kvm.

11. The device according to claim 7, further comprising:
  generating a storage device file corresponding to the shared data at the target terminal, before the determining migration operations respectively corresponding to the local data and the shared data in response to the migration request.

12. The device according to claim 11, further comprising:
  performing an un-mounting operation on the storage device file and removing the local data, after the executing the migration operations corresponding to the local data and the shared data.

13. A non-transitory computer storage medium storing computer readable instructions executable by a processor, the computer readable instructions when executed by the processor, causing the processor to:
  receive a migration request for migrating a virtual machine, wherein to-be-migrated data of the virtual machine comprises local data locally stored and shared data accessible by the virtual machine at a plurality of locations;
  determine migration operations respectively corresponding to the local data and the shared data in response to the migration request; and
  execute the migration operations corresponding to the local data and the shared data, to complete migration of the virtual machine;
wherein the determining migration operations respectively corresponding to the local data and the shared data in response to the migration request comprises:
  determining a local storage device identifier of a local storage device corresponding to the local data and a shared storage device identifier of a shared storage device corresponding to the shared data and binding the shared storage device identifier to shared storage device feature information presenting a feature of the shared storage device, in response to the migration request;
  transmitting the local storage device identifier and the shared storage device identifier, as an input parameter of a driver layer under a local storage mode interface of a cloud computing management framework OpenStack, to the driver layer, to trigger a storage device distinguishing operation of the driver layer, wherein the storage device distinguishing operation comprises: determining whether a storage device identifier in the input parameter corresponds to the shared storage device feature information to obtain a determination result, and distinguishing the local storage device identifier from the shared storage device identifier in the input parameter based on the determination result; and determining the migration operations respectively corresponding to the local data and the shared data based on the local storage device identifier and the shared storage device identifier.

\* \* \* \* \*